July 18, 1939. R. TOWNSEND 2,166,650
SELF-CENTERING GAUGE FOR CASING AND DRILL PIPES
Filed Sept. 28, 1937
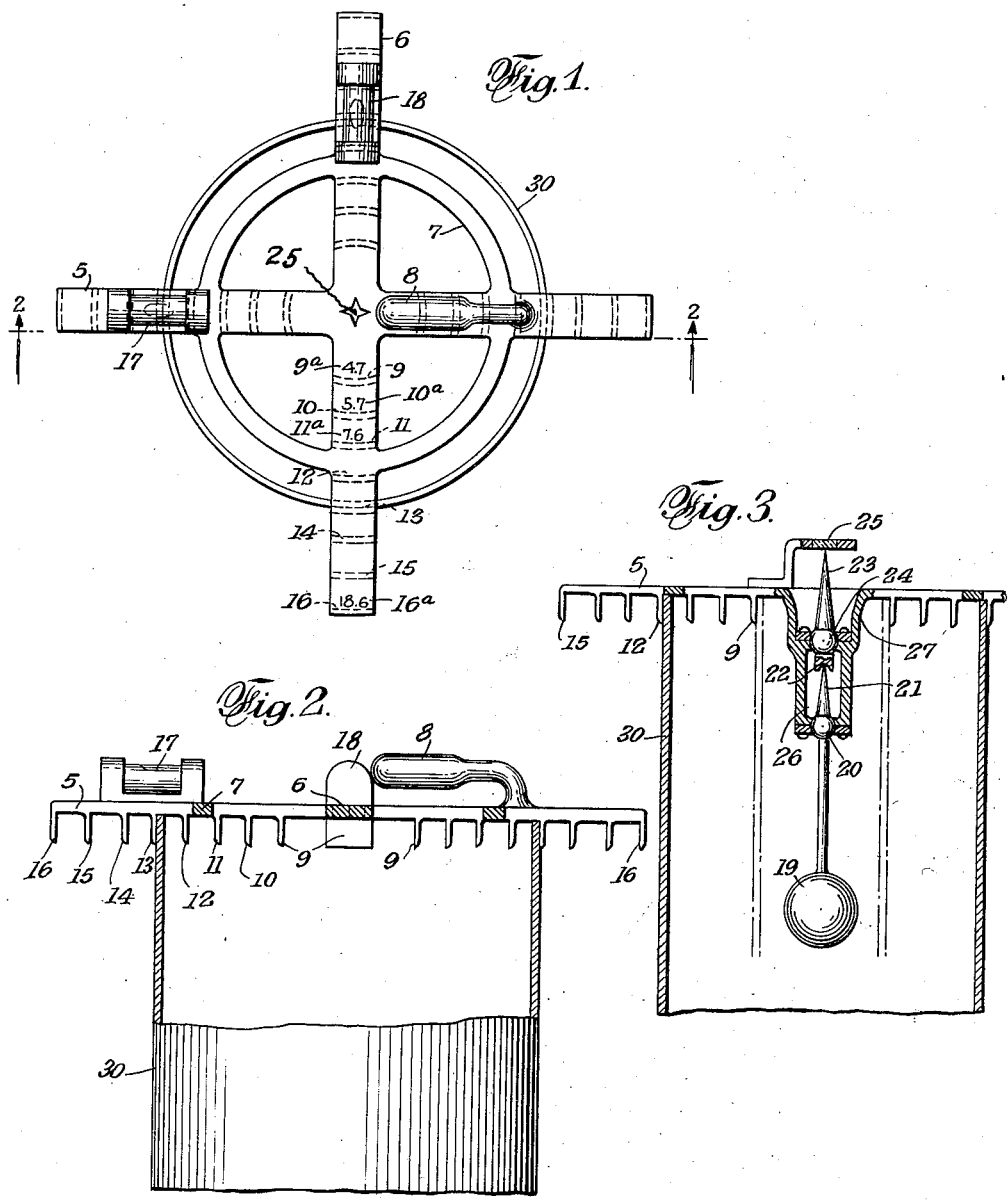
REX TOWNSEND
INVENTOR Patented July 18, 1939

2,166,650

UNITED STATES PATENT OFFICE 2,166,650

SELF-CENTERING GAUGE FOR CASING AND DRILL PIPES

Rex Townsend, Greenwich, Conn.

Application September 28, 1937, Serial No. 166,050

1 Claim. (Cl. 33—178)

The invention herein disclosed relates to the levelling and gauging of casing and drill pipe used in oil wells and other borings.

When surface casing is set in oil wells prior to cementing, considerable difficulty is usually experienced in centering and levelling it, with the result that crooked holes are often started because of some inaccuracy in the centering and levelling.

The general objects of this invention are to provide a device immediately adaptable to various standard sizes of casing and drill pipe and by which the casing or pipe can be quickly and accurately centered and levelled.

Also it is an object of the invention to provide such a device, which may be used as a gauge for instantly determining the size of casing and pipe in the racks.

Further objects are to provide a device of the character indicated, which will be light and easy to handle and relatively inexpensive.

Other objects and the novel features of the invention by which all objects are attained are set forth and will appear in the course of the following specification.

The drawing accompanying and forming part of the specification illustrates practical commercial embodiments of the invention. The structure however may be modified and changed in various ways within the true spirit and broad scope of the invention as hereinafter defined and claimed.

Fig. 1 is a plan view of one form of the combination centering, levelling and gauging device as in use.

Fig. 2 is a broken cross-sectional view as on substantially the plane of line 2—2 of Fig. 1.

Fig. 3 is a broken cross-sectional view of a modified form of the invention.

As shown in the drawing, the device consists of a light frame having pipe gauging elements by which it can be immediately centered over the pipe casing and carrying universally indicating level means.

The frame is indicated as of cruciform design, comprising crossed arms or bars 5, 6, braced by a circular connecting web 7, and equipped with a handle 8, offset from the body of the frame sufficiently to afford a convenient firm hand grip.

Preferably, the frame is of sufficient extent to span the ends of the larger or most generally used sizes of casing. In the example, the device is intended for fitting and gauging eight different sizes of pipe and casing running from the smallest size of 4.7/10 inches to 18.6 inches outside diameter. For such purposes, the bars of the frame carry at the underside of the same the companion sets of gauge fingers 9, 10, 11, 12, 13, 14, 15, 16.

For practical reasons, pipe size indications are preferably provided on the outer face of the frame as indicated at 9a, 10a, etc., corresponding to the calipering and gauging fingers 9, 10, etc., projecting from the under or inner face of the frame. These fingers may be curved as indicated, to substantially fit the curvature of the pipe or casing and together with the inner face of the frame may be finished smooth and flush to accurately fit the ends of the pipe casing, indicated generally at 30.

The level means consists in the first disclosure of a pair of what are generally termed spirit levels 17, 18, on the two angularly related bars of the frame, so that one will indicate deviations in one vertical plane and the other deviations in a vertical plane at right angle to the first plane and both, deviations from intermediate planes.

Other forms of level means may be substituted. Thus as shown in Fig. 3, the plumb bob form of universally acting level may be used, consisting of a weight 19, swung by a ball joint 20, from the center of the frame and having a leverage extension 21, universally jointed at 22, to the lower end of a pointer 23, mounted with a ball joint 24, and adapted to register on a suitable scale, such as crossed indicator lines on an overstanding glass 25. The multiplying leverage connection between the pendulum weight and pointer causes small deviations in level to be magnified and hence easily read on the scale or indicator glass. The two ball joints may be sealed in a lubricant containing chamber 26, forming part of the hollow bracket 27, dependent from the center of the frame.

Both forms of the device illustrated carry a center point marking for use with a plumb bob or the like, hung from the center of the derrick. In the first embodiment, this center marking is indicated at 25, and in the second embodiment, the crossed lines or other indication on the glass 25, forms the center marker.

In use for setting casing, the device is simply engaged over and forced down firmly on the end of the casing, the gauge fingers in such action automatically attending to the centering instrument on the casing. With the device firmly in position, the two angularly related levels in the first instance, or the pendulum level in the second instance, will show at once whether the casing is level and in what direction and to what extent any deviation lies. As corrections are made, the levels will so show. In testing for final level, the instrument may be rotated to different angular positions on the end of the casing, the levels then showing any remaining small deviations.

The handle provides a ready means for applying the device over the end of the pipe or casing and is particularly useful for setting the device over the ends of pipe and casing in racks, for calipering and ascertaining the sizes of pipe and casing. If desired however, this handle may be omitted and the device be handled by means of radially related arms or the curved connecting rib between the same.

The device may be made of metal or other materials. Light alloys are suited to the purpose, if sufficiently strong and rigid to hold their shape for all reasonable handling of the device. The levels may be readily removable and replaceable, so that in case of breakage, one may be quickly substituted for another.

In the first form, the instrument is shown constructed for use with eight different sizes of pipe and casing and in the second illustration, the gage is shown constructed for use with only seven different sizes. It will be understood from this that the instrument may be made for use with any different number of pipe and casing sizes and that it may for example, be made up in small sizes covering only a limited number of different pipe and casing sizes and in a larger form for use with all standard sizes of pipe and casing.

The frame, instead of being made as one solid continuous piece, may be made of separate pieces joined so that they may be rigidly connected, but adapted to be disconnected or folded to a knockdown condition, as for shipment or the like. The device is constructed for use without interfering with the "elevator" usually employed for support of the pipe or casing. For some forms of elevators, it may be desirable to make the frame in a folding form, which can be inserted between the arms of the elevator and then be expanded to set it over the end of the pipe or casing supported by the elevator. While shown with four radial arms, it will be appreciated that the number of arms may vary. In some instances, particularly for avoiding certain elevator constructions, the device may be made with only three arms or with a greater number than four arms. In all such instances, the liquid levels will preferably be set on the frame, substantially at right angles to each other. As indicated, it is desirable usually to locate the liquid levels toward the outer ends of the arms, or as far as possible away from the center to get the maximum tilting effect.

What is claimed is:

A self-centering gauge for casing and drill pipe, comprising a light but rigid frame engageable over the end of pipe or casing, calipering fingers fixed at different measured distances apart for different sizes of pipe and casing projecting angularly from the back of said frame for automatically centering the frame over the ends of different size pipe or casing, means at the face of the frame for showing the size pipe with which the calipering and centering fingers are engaged, a center marking on the face of the frame, and handle means clear of said center marking and by which said frame may be quickly centered and held in position over different size pipe and casing.

REX TOWNSEND.